Figure 1:
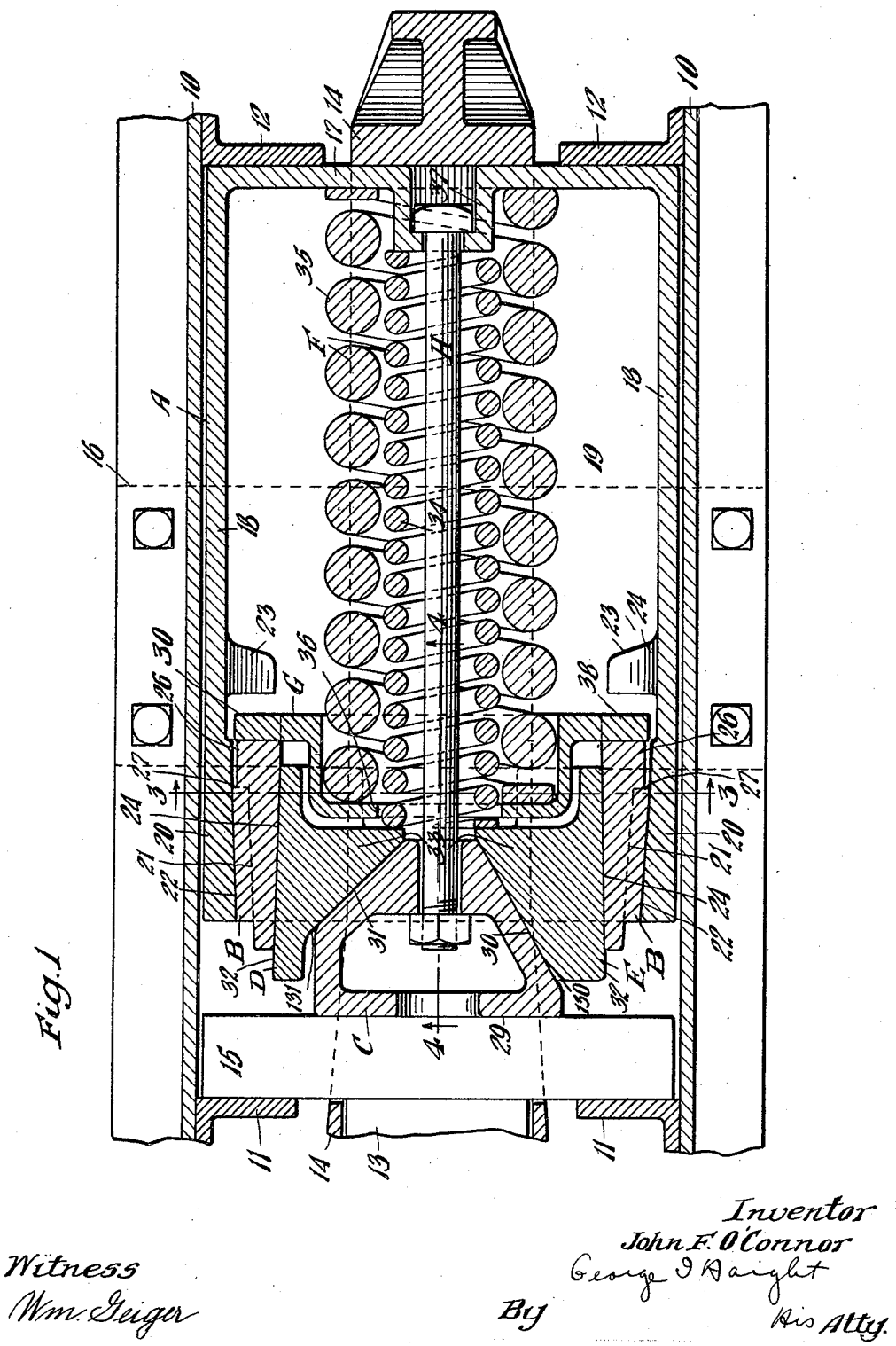

Dec. 10, 1929.　　　J. F. O'CONNOR　　　1,738,723

FRICTION SHOCK ABSORBING MECHANISM

Filed Jan. 27, 1927　　　2 Sheets-Sheet 1

Witness
Wm. Geiger

Inventor
John F. O'Connor
By George I. Haight
His Atty.

Dec. 10, 1929.  J. F. O'CONNOR  1,738,723
FRICTION SHOCK ABSORBING MECHANISM
Filed Jan. 27, 1927  2 Sheets-Sheet 2
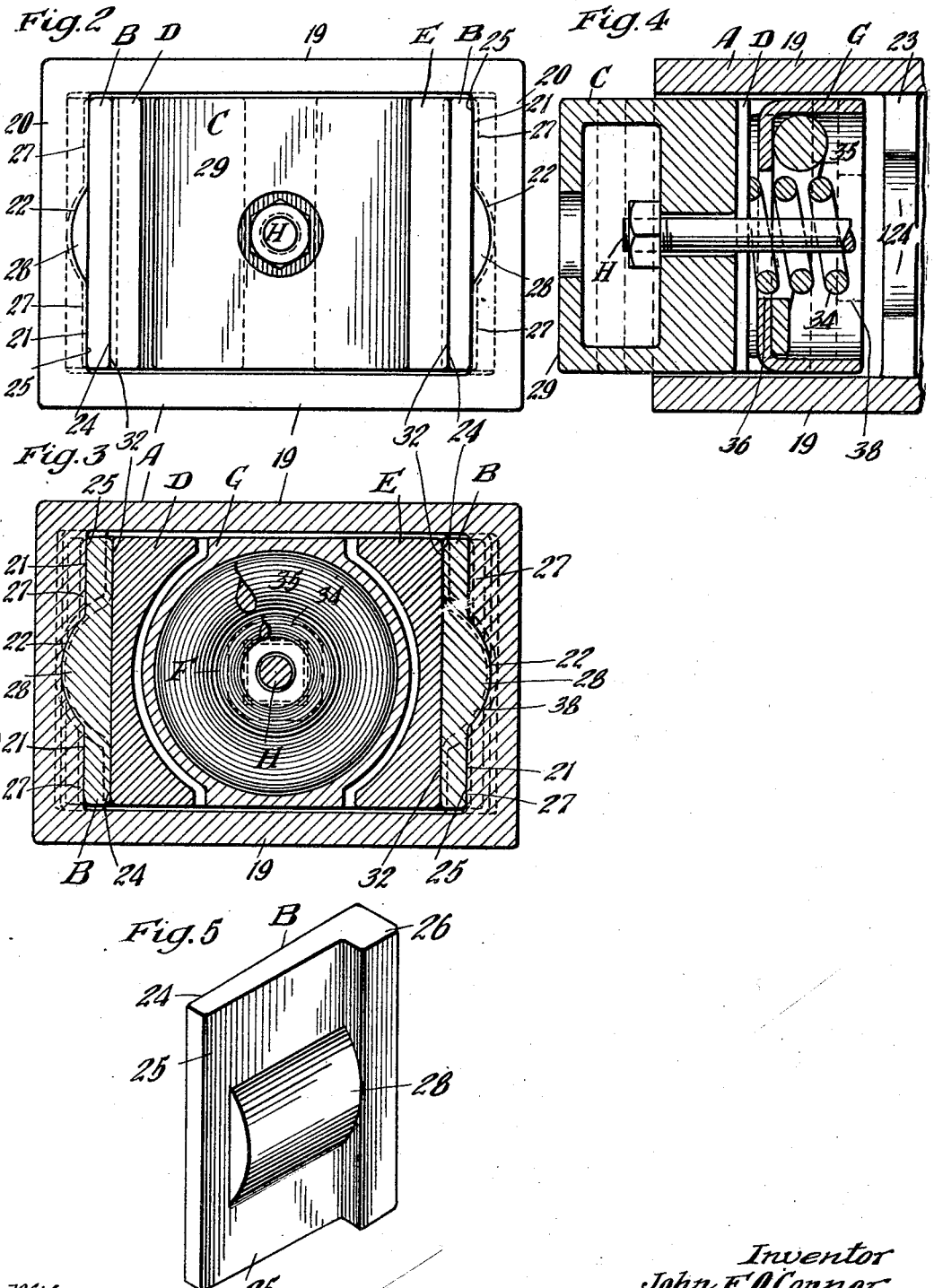

Patented Dec. 10, 1929

1,738,723

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed January 27, 1927. Serial No. 164,013.

This invention relates to improvements in friction shock absorbing mechanisms.

One object of the invention is to provide a friction shock absorbing mechanism, especially adapted for railway draft riggings, affording a free spring action during the first part of the compression stroke to absorb the lighter shocks to which the mechanism is subjected followed by heavier frictional resistance during the remainder of the compression stroke to take care of the heavier shocks, wherein the free spring action is obtained by bodily movement of friction means including co-operating friction elements certain of which are initially slidable on a column element and are arrested upon a predetermined compression of the mechanism to compel relative movement of said friction elements to augment the resistance during the latter part of the compression stroke.

Another object of the invention is to provide a friction shock absorbing mechanism of the character indicated, of simple construction, which may be economically manufactured, including a spring cage, a spring resistance, co-operating friction elements within the cage, certain of which have limited relative movement on the walls of the cage, the cage walls diverging inwardly to permit movement in unison of said friction elements during a predetermined initial portion of the compression stroke of the mechanism opposed by the spring resistance to afford relatively light action, wherein the friction elements are relatively movable after said initial compression to augment the resistance offered to absorb the heavier shocks to which the mechanism is subjected.

A more specific object of the invention is to provide a friction shock absorbing mechanism including a spring cage having opposed, inwardly diverging side walls on which friction elements in the form of liners have limited movement longitudinally of the cage, movable friction means cooperating with the liners, and spring resistance means opposing relative movement of both the liners and friction means with respect to the cage.

Other objects of the invention will more clearly appear from the description and claims hereinafter following.

In the drawings forming a part of this specification, Figure 1 is a horizontal, longitudinal, sectional view of a portion of a railway draft rigging showing my improvements in connection therewith. Figure 2 is a front end elevational view of the improved shock absorbing mechanism proper. Figure 3 is a transverse, vertical, sectional view corresponding substantially to the line 3—3 of Figure 1. Figure 4 is a longitudinal, vertical, sectional view of the front end portion of the shock absorbing mechanism proper illustrated in Figure 1 and corresponding to the line 4—4 of said figure. And Figure 5 is a detailed perspective view of one of the movable liner elements employed in connection with my improved shock absorbing mechanism.

In said drawings, 10—10 indicate channel-shaped center or draft sills of a railway car underframe to the inner sides of which are secured front stop lugs 11—11 and rear stop lugs 12—12. The inner end portion of the draw-bar is designated by 13, to which is operatively connected a yoke 14 of well known form. The shock absorbing mechanism proper, as well as a front main follower 15, is disposed within the yoke. The yoke and the parts therewithin are supported in operative position by a detachable saddle plate 16 fixed to the draft sills.

My improved shock absorbing mechanism comprises, broadly a spring cage A; a pair of liners B—B; a main wedge C; a pair of friction shoes D and E; a main spring resistance F; a spring follower G; and a retainer bolt H.

The spring cage A is in the form of a substantially rectangular box-like casting having a vertical, transverse end wall 17, longitudinally disposed vertical spaced side walls 18—18; and longitudinally disposed horizontal spaced top and bottom walls 19—19. The end wall 17 of the cage A co-operates with the stop lugs 12 in the manner of the usual rear follower. The side walls 18 of the cage A are thickened at the forward end as indicated at 20 and the thickened sections 20 are provided with inwardly diverging flat bearing surfaces 21 on the inner sides thereof. The bearing surfaces 21 have a concave groove 22 centrally thereof extending longitudinally of the mechanism and co-operating with the liners B in a manner hereinafter set forth. Rearwardly of the inwardly diverging surfaces 21, the side walls 18 of the cage A are provided with inwardly projecting ribs 23—23 which are centrally cut away as indicated at 124 in Figure 4 to provide clearance for the spring follower cap as hereinafter pointed out. It will thus be seen that, in effect, top and bottom stop lugs are provided by the ribs 23. The stop lugs referred to co-operate with the inner ends of the liners B to positively limit inward movement thereof with respect to the cage A.

The liners B, which are two in number, are in the form of relatively thick rectangular plates, as most clearly shown in Figures 1 and 5. On the inner side, each liner B is provided with a longitudinally extending flat friction surface 24 adapted to co-operate with the corresponding friction shoe. The opposed surfaces 24 of the liners B converge inwardly of the mechanism to produce a differential action. On the outer side, each plate B is provided with a flat bearing surface 25 adapted to cooperate with the bearing surface 21 at the same side of the cage A. At the rear end, the liner B is laterally enlarged to provide a relatively heavy flange 26 adapted to co-operate with a shoulder 27 on the corresponding side wall of the cage A to limit outward movement of the liner. Each liner B, is also provided with a cylindrical rib 28 on the outer side thereof adapted to engage within the concave recess or seat 22 of the side wall 18 of the cage to prevent vertical displacement of the liner and maintain the top and bottom edges of the same spaced from the top and bottom walls 19 of the cage A.

The wedge block C is in the form of a cored casting having a flat front end face 29 adapted to bear on the inner side of the main follower 15. At the inner end, the wedge block C is provided with a pair of inwardly converging wedge faces 30 and 31 on the opposite sides thereof. The wedge face 30, as shown, is disposed at a relatively keen wedge-acting angle with respect to the longitudinal axis of the mechanism while the wedge face 31 is disposed at a relatively blunt releasing angle to said axis.

The friction shoes D and E are disposed at opposite sides of the mechanism and are interposed between the wedge C and the liners B. The two shoes D and E are of similar design except as hereinafter pointed out. Each of the shoes is provided with an outer longitudinally disposed flat friction surface 32 adapted to co-operate with the friction surface 24 of the corresponding liner B. On the inner side, each shoe is provided with a lateral enlargement 33 having a wedge face on the forward side thereof, the wedge face of the shoe E being designated by 130 and co-operating with the wedge face 30 of the block C and correspondingly inclined thereto and the wedge face of the shoe D being designated by 131 and co-operating with the wedge face 31 of the wedge block C and correspondingly inclined thereto.

The spring resistance F comprises an inner relatively light coil 34 and a relatively heavier outer coil 35. The spring follower G, which is in the form of a cup-like cap member, is interposed between the spring resistance F and the liners and friction shoes. The spring follower G has the outer wall of the cup-like section thereof bearing directly on the front end of the coil 35 of the spring resistance. The end wall of the cup section of the spring follower G is provided with an opening 36 through which the inner coil 34 of the spring freely extends, the front end of this coil bearing on the inner ends of the enlargements 33 of the friction-shoes. The rear end of the spring 35 bears directly on the end wall 17 of the spring cage and the rear end of the spring 34 bears on an inwardly projecting hollow boss 37 on the end wall of the cage A.

The spring follower G is provided with a relatively heavy laterally projecting flange 38, which bears on the inner ends of the liners B in the normal position of the parts and throughout the first part of the compression stroke of the mechanism. The cup-shaped cap section of the spring follower G is normally slightly spaced from the inner ends of the enlargements on the shoes D and E to provide for a certain amount of preliminary action.

The shock absorbing mechanism is held assembled by the retainer bolt H which has its opposite ends anchored to the end wall 17 of the cage A and the wedge block C. The head of the bolt is anchored within the hollow boss 37 on the end wall of the cage and the nut of the bolt is disposed within the opening of the cored wedge block C. The retainer bolt H, in addition to serving to hold the parts assembled, also serves to maintain the mechanism of uniform overall length and the spring resistance F under initial compression. Due to the spring resistance F being under initial compression, the same urges the parts of the mechanism outwardly, thereby compensating for wear of the various friction and wedge faces.

The operation of my improved shock absorbing mechanism, assuming a compression stroke is as follows: The front follower 15 and the spring cage A will be moved relatively to each other thereby carrying the wedge block C inwardly of the cage A thereby forcing the friction shoes D and E inwardly of the cage also against the resistance of the spring coil 34. A wedging action will thus be set up between the block C and the shoes, forcing the shoes into frictional engagement with the friction surfaces of the liners B. Due to the friction thus created between the liners and the shoes, the liners will be carried inwardly of the cage A in unison with the shoes and wedge block during the first part of the compression stroke. This action is facilitated by the diverging relation of the bearing surfaces 21 of the cage A, it being evident that slippage will occur more readily on these diverging faces than on the converging co-operating surfaces of the shoes and liners B. Inward movement of the liners B is resisted by the spring coil 35, through the medium of the spring follower G and by the coil 34 through the medium of the friction shoes D and E. Inward movement of the liners B in unison with the wedge block and friction-shoes will continue until the inner ends of the liners engage the ribs 23 on the cage A, whereupon movement of the liners will be positively arrested, thus forcing the friction-shoes D and E to move relatively to the liners during the remainder of the compression stroke. Inasmuch as the friction surfaces of the liners converge inwardly of the mechanism, a differential action will be effected thereby producing additional compression of the coils 34 and 35 of the spring resistance F. It will be evident that during the relative movement of the shoes and the liners, the resistance offered is greatly augmented due to the friction between these parts, thereby taking care of the heavier shocks which are encountered. The described action will continue either until the actuating force is reduced or until the main follower 15 comes into engagement with the outer end of the cage A, whereupon the actuating force will be transmitted directly through the cage, the latter acting as a solid column load-transmitting member to transmit the load to the draft sills and prevent undue compression of the spring resistance F.

When the actuating force is reduced during release of the mechanism, the expansive action of the coils 34 and 35 of the spring resistance will carry the shoes D and E and the wedge block C outwardly of the mechanism and due to the friction existing between the shoes and the liners B, the latter will be carried outwardly in unison therewith also. Outward movement of the liners B will finally be arrested by engagement of the flanges 26 thereof with the shoulders 27 and the side walls of the cage, whereupon the shoes will be forced outwardly with respect to the liners by the springs 34 and 35. Expansion of the spring coil 35 is limited by engagement of the flange 28 of the spring follower G with the inner ends of the liners B. After movement of the spring follower G is arrested, further expansion of the coil 34 of the spring, forces the shoes D and E outwardly in spaced relation to the cap section of the spring follower until movement of the shoes is positively arrested by the wedge C being limited by the retaining bolt H.

From the preceding description taken in connection with the drawings, it will be evident that I have provided a very simple and efficient construction of shock absorbing mechanism, wherein initial, substantially free spring action is obtained, followed by heavier frictional resistance. By the provision of replaceable liners which may be readily assembled with the mechanism and which may be economically manufactured by simple operations, the cost of construction and maintenance of the gear is greatly reduced.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage having inwardly diverging walls; of liners within the cage having limited longitudinal movement with respect to the cage on said diverging walls; friction means adapted for relative movement with respect to said liners after the latter have had their movement arrested; and spring resistance means opposing movement of the liners and friction means inwardly of the cage.

2. In a friction shock absorbing mechanism, the combination with a spring cage having inwardly diverging opposite side walls; of liners within the cage having limited movement longitudinally of the cage on said side walls; means for arresting movement of the liners after a predetermined partial compression of the mechanism; friction-shoes co-operating with the liners; a wedge block engaging the shoes; and spring means opposing movement of the shoes and liners inwardly of the cage.

3. In a friction shock absorbing mechanism, the combination with a spring cage having inwardly diverging walls; of liners movable on said walls; stop shoulders on the cage for arresting inward movement of the liners after a predetermined initial compression of the mechanism; friction shoes co-operating with said liners and movable relatively thereto inwardly of the mechanism after movement of said liners has been arrested; pressure-transmitting wedge means engaging said shoes; and spring resistance means within the cage opposing inward movement of said shoes and liners.

4. In a friction shock absorbing mechanism, the combination with a spring cage having flat inwardly diverging interior bearing surfaces; of liners having movement inwardly of the cage on said bearing surfaces less than the full compression stroke of the mechanism, said liners having longitudinally disposed friction surfaces; friction-shoes co-operating with said liners; wedge means having engagement with the shoes; spring resistance means within the cage including a relatively heavy coil and a lighter coil; a spring follower interposed between said heavy coil and the liners and said lighter coil bearing directly on the shoes.

5. In a friction shock absorbing mechanism, the combination with a spring cage having interior, inwardly diverging bearing surfaces; of opposed liners having movement longitudinally of the cage on said bearing surfaces during part only of the compression stroke of the mechanism, said liners having longitudinally disposed friction surfaces converging inwardly of the mechanism; friction-shoes co-operating with the friction surfaces of the liners; wedge means engaging said shoes; and spring resistance means within the cage yieldingly opposing movement of the liners and shoes.

6. In a friction shock absorbing mechanism, the combination with a rectangular spring cage having interior flat inwardly diverging bearing surfaces on the opposed side walls thereof; of opposed liners having movement inwardly of the cage on said bearing surfaces during the first part only of the compression stroke of the mechanism, said liners having longitudinally disposed friction surfaces; friction-shoe co-operating with the liners; wedge means engaging the shoes; and spring resistance means within the cage including a heavy outer coil interposed between the liners and the cage and a lighter inner coil, said inner coil being directly interposed between said cage and shoes.

In witness that I claim the foregoing I have hereunto subscribed my name this 24th day of January, 1927.

JOHN F. O'CONNOR.